United States Patent

[11] 3,612,493

[72] Inventor Constant Johan Nauta
   Overveen, Netherlands
[21] Appl. No. 840,999
[22] Filed July 11, 1969
[45] Patented Oct. 12, 1971
[73] Assignee Nautamix Patent A. G.
   Zug, Switzerland
[32] Priority July 19, 1968
[33] Netherlands
[31] 6810332

[54] LOWER BEARING ASSEMBLY FOR A MIXING SCREW
   7 Claims, 1 Drawing Fig.
[52] U.S. Cl. .................................................... 259/102,
   308/1
[51] Int. Cl. ..................................................... B01f 7/00
[50] Field of Search ........................................... 259/102,
      109, 5-8, 16, 21-24, 32-34, 40-44, 64-67, 16 G;
      308/1

[56] References Cited
   UNITED STATES PATENTS
3,338,562 8/1967 Fox ............................... 259/40
3,450,390 6/1969 Nauta ............................ 259/102

Primary Examiner—Jordan Franklin
Assistant Examiner—Geo. V. Larkin
Attorney—Arnold Robinson ABSTRACT: A lower bearing for the shaft of a mixing screw has a fork-shaped lower end portion having two spaced legs between which a guide plate is adapted to be slid laterally into assembled position and thereafter supported by said legs in said assembled position. A vessel in which the mixing screw is mounted has a lower arm mounting a circular pin. The guide plate has an opening in which said pin is received to thereby rotatably support the lower end of the mixing screw in said vessel.

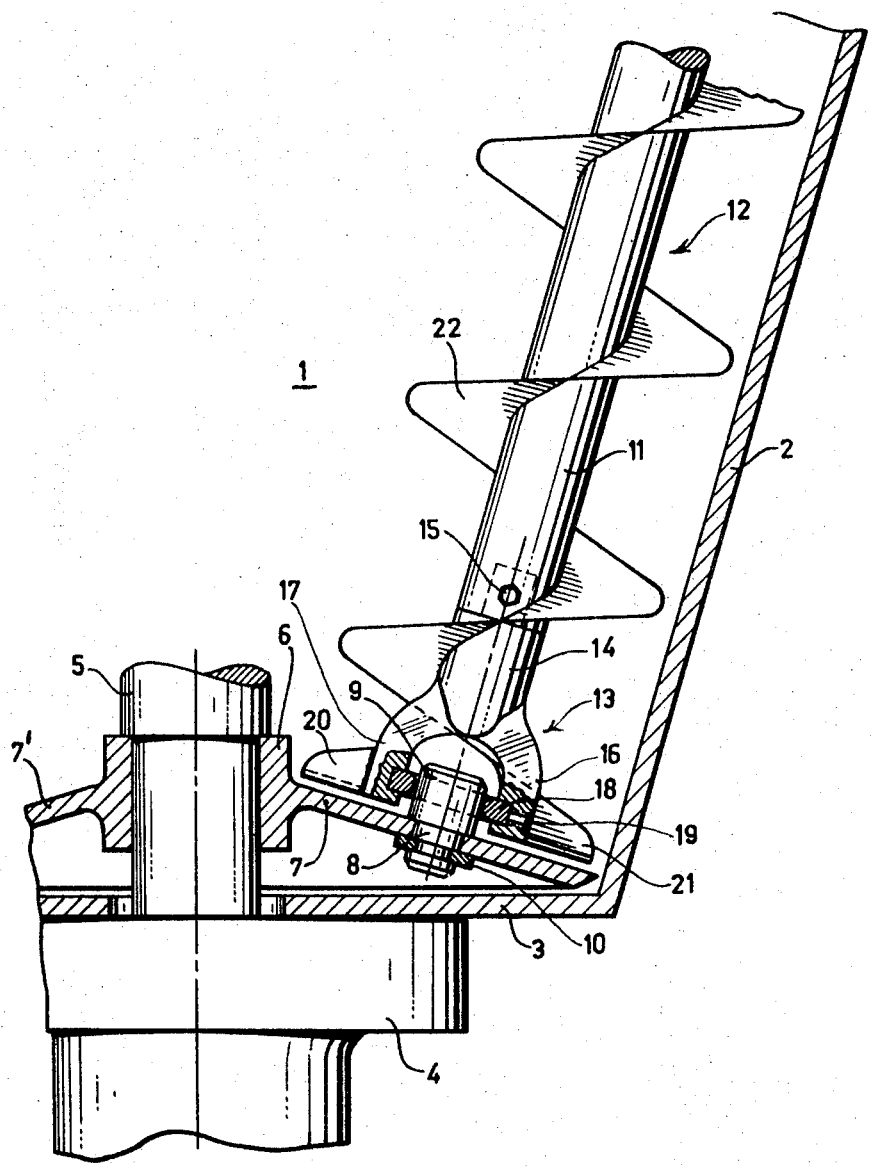

LOWER BEARING ASSEMBLY FOR A MIXING SCREW

This invention relates to a lower bearing for the shaft of a mixing screw provided in a vessel with a vertical axis of symmetry. The upper and lower ends of the mixing screw are eccentrically and rotatably supported in the vessel in or on arms having their longitudinal axes situated in a vertical plane passing through the axis of the vessel. The inner end of each arm is connected to a central member rotatably mounted in the vessel. Driving means are adapted to rotate the mixing screw about its own longitudinal axis while simultaneously rotating the mixing screw about the axis of the vessel.

An object of the present invention is to improve the lower bearing for the shaft of the mixing screw so that the lower end of the said shaft is rotatably supported against lateral or transverse forces only, and there is no thrust or longitudinal support for the mixing screw at its lower end. Accordingly, the friction and wear of said lower bearing is reduced as much as possible. Means are also provided to balance the load to which the lower end of the mixing screw blade is exposed.

According to the invention, there is provided a lower bearing comprising a circular pin fixed on a lower arm in the vessel. A fork-shaped section is provided at the lower end of the shaft of the mixing screw, and the axes of the pin, the fork-shaped end, and the shaft of the mixing screw are aligned. A guide member is accommodated within the space between the legs of the fork-shaped end. The general plane of the guide member is perpendicular to the axis of the pin, and an opening in said guide member receives the pin to define a bearing support. A scraper blade is fixed on the outside face of the fork-shaped end and arranged diametrically opposite to the lowest quarter portion of the lowest full helix of the blade of the mixing screw.

For a better understanding of the invention and to show how the same may be carried into effect, reference will now be made to the accompanying drawing showing a partial sectional and elevational view of one embodiment of the bearing of the instant invention.

A mixing vessel 1 in the form of an inverted, truncated, hollow cone of which only parts of the vessel wall 2 and the base wall 3 are shown, is provided with a shaft 5 at the vertical axis of said vessel. Driving means 4 arranged underneath the base wall 3 are adapted to rotate the shaft 5 about its own longitudinal axis. Fixed on the shaft 5 is a collar 6 having two arms 7 and 7'. Only the arm 7 is fully shown and by way of example this arm 7 and the details of the lower bearing associated with said arm will be described in detail hereafter.

The arm 7 is provided with an aperture in which a portion 8 of a circular pin 9 is received, said portion 8 having a diameter smaller than the diameter of the pin 9. The portion 8 includes an annular groove adapted to receive a resilient split ring 10 to hold the pin 9 in fixed position. The axis of the pin 9 is aligned with the axis of a shaft 11 of a mixing screw 12 provided in the mixing vessel 1. Only a portion of the mixing screw 12 is shown. For the sake of simplicity, the upper bearing for the mixing screw 12 and further details of the means for effecting rotation of said mixing screw about its own longitudinal axis are omitted as these omitted elements do not form a part of this invention.

The shaft 11 of the mixing screw 12 is provided with an inverted U or fork-shaped end member 13. By means of a smaller diameter end section (not shown) at the upper end of the cylindrical section 14, the end member 13 extends into a hollow portion of the shaft 11 and is connected to said shaft by means of a bolt 15. Consequently, the axis of the fork-shaped end member 13 is aligned with the axis of the shaft 11. The inner faces of the flattened legs 16 and 17 of the fork-shaped end member 13 are provided with grooves, one arranged exactly opposite to the other and both such grooves extending perpendicularly to the axis of the pin 9. A guide plate 18 is slid into and received by the grooves of the fork-shaped end member 13. By means of a locking screw pin 19 accommodated in the leg 16 of the fork-shaped end member 13, the guide plate 18 can be adjusted. The guide plate 18 is provided with a circular opening having an internal diameter corresponding exactly to the outer diameter of the body of the pin 9, whereby the pin 9 is received in said circular opening to define a lower bearing support for the mixing screw.

A scraper blade 20 is fixed to the leg 17 of the fork-shaped end member 13. The scraper blade 20 is shaped like and arranged diametrically opposite to the lowest quarter portion 21 of the screw blade 22 of the mixing screw 12.

The mixing screw 12 is rotatably supported in a bearing (not shown) at its upper end. The upper bearing is carried in a supporting arm (not shown) and supports the weight of the mixing screw. At its lower end the mixing screw is rotatably supported by means of the pin 9, the guide plate 18, and the legs 16 and 17 of the fork-shaped end member 13 associated with the guide plate 18. The guide plate 18 does not support the weight of the mixing screw nor does it provide a thrust bearing for the mixing screw. To the contrary, the guide plate merely supports the mixing screw laterally. By using suitable materials for the pin 9 and the guide plate 18 friction and wear in the lower bearing are reduced to a minimum. The scraper blade 20 in cooperation with the portion 21 of the screw blade 22 serves to balance and tends to equally distribute the load to which the mixing screw is exposed during operation particularly in the area of the lower bearing. This equal distribution of load is advantageous in that it provides a more even load on the lower bearing.

The advantages of the present invention, as well as certain changes and modifications of the disclosed embodiment thereof, will be readily apparent to those skilled in the art. It is the applicant's intention to cover all those changes and modifications which could be made to the embodiment of the invention herein chosen for the purposes of the disclosure without departing from the spirit and scope of the invention.

I claim:

1. In a mixing device, a lower bearing assembly for the shaft of a mixing screw disposed in a vessel having a vertical axis of symmetry, said mixing screw having its longitudinal axis disposed in a vertical plane containing said axis of symmetry, said vessel having a lower support arm therein mounting a circular pin, said mixing screw having a lower fork-shaped end portion, a guide member supported by said fork-shaped end portion, said guide member having an opening in which said pin is received to rotatably support the lower end of said mixing screw in said vessel.

2. A lower bearing assembly according to claim 1 wherein said fork-shaped end portion comprises a pair of spaced legs and said guide member is adapted to be slid into the space between said two legs and supported in place by the latter.

3. A lower bearing assembly according to claim 2 wherein the inner opposing faces of said legs are each provided with a groove to slidably receive and support said guide member in position.

4. A lower bearing assembly according to claim 3 further comprising a locking pin in one of said legs for engaging said guide member.

5. A lower bearing assembly according to claim 1 wherein a collar member integral with said lower support arm is rotatably mounted on the vertical axis of said vessel.

6. A lower bearing assembly according to claim 1 wherein said mixing screw comprises a helical blade having a lower end terminating at the outer face of said fork-shaped member, and a scraper blade on the outer face of said fork-shaped member located diametrically opposite to said lower terminating end of said helical blade.

7. A lower bearing assembly according to claim 6 wherein said scraper blade has a configuration corresponding to the lowest quarter portion of the lowest full helix of the mixing screw helical blade.